(12) United States Patent
Takefman et al.

(10) Patent No.: US 7,453,873 B1
(45) Date of Patent: Nov. 18, 2008

(54) METHODS AND APPARATUS FOR FILTERING PACKETS FOR PREVENTING PACKET REORDER AND DUPLICATION IN A NETWORK

(75) Inventors: Michael Lewis Takefman, Ottawa (CA); Leonid Goldin, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 1021 days.

(21) Appl. No.: 10/436,676

(22) Filed: May 13, 2003

(51) Int. Cl.
*H04L 12/28* (2006.01)
(52) U.S. Cl. .................. 370/389; 370/404; 370/465; 709/242
(58) Field of Classification Search ............ 370/254
See application file for complete search history.

(56) References Cited

U.S. PATENT DOCUMENTS

| | | | | |
|---|---|---|---|---|
| 5,150,356 A | * | 9/1992 | Tsutsui | 370/223 |
| 6,331,985 B1 | * | 12/2001 | Coden | 370/403 |
| 7,054,951 B1 | * | 5/2006 | Kao et al. | 709/242 |
| 2004/0103179 A1 | * | 5/2004 | Damm et al. | 709/223 |

OTHER PUBLICATIONS

LAN MAN Standards Committee of the IEEE Computer Society, "Media Access Control (MAC) Parameters, Physical Layer Interface, and Management Parameters," Apr. 16, 2002, IEEE Draft P802.17/D0.2, Institute of Electrical and Electronics Engineers, Inc., New York, New York.

LAN MAN Standards Committee of the IEEE Computer Society, "Resilient Packet Ring Access Method & Physical Layer Specifications," Apr. 9, 2003, IEEE Draft P802.17/D2.2, Institute of Electrical and Electronics Engineers, Inc., New York, New York.

* cited by examiner

*Primary Examiner*—Robert W Wilson
(74) *Attorney, Agent, or Firm*—The Law Office of Kirk D. Williams

(57) ABSTRACT

Methods and apparatus are disclosed for identifying the relevancy of packets. In one embodiment, source addresses are associated with network topology indications. When a packet is received, its network topology indication is compared with the corresponding one retrieved from a data structure to determine whether to drop the packet. Source addresses may also be associated with authorized interfaces to determine whether a packet was received on an authorized interface. In one embodiment, a maintained network topology indication is associated with a packet. After it is processed, the corresponding latest network topology indication is retrieved and compared with that previously associated with the packet. In one embodiment, upon a change in a network topology indication associated with an interface, control packets are placed in each of the queues corresponding to the destination interface, so it can be readily identified when this update has been propagated through the system.

31 Claims, 15 Drawing Sheets

CONTROL PLANE PROCESSING

**CONTROL PLANE PROCESSING

INGRESS PACKET PROCESSING

INGRESS PACKET PROCESSING

RESPONSE TO NTI
CHANGE ON INTERFACE

**PROCESSING OF PACKETS RECEIVED
FROM SWITCHING FABRIC

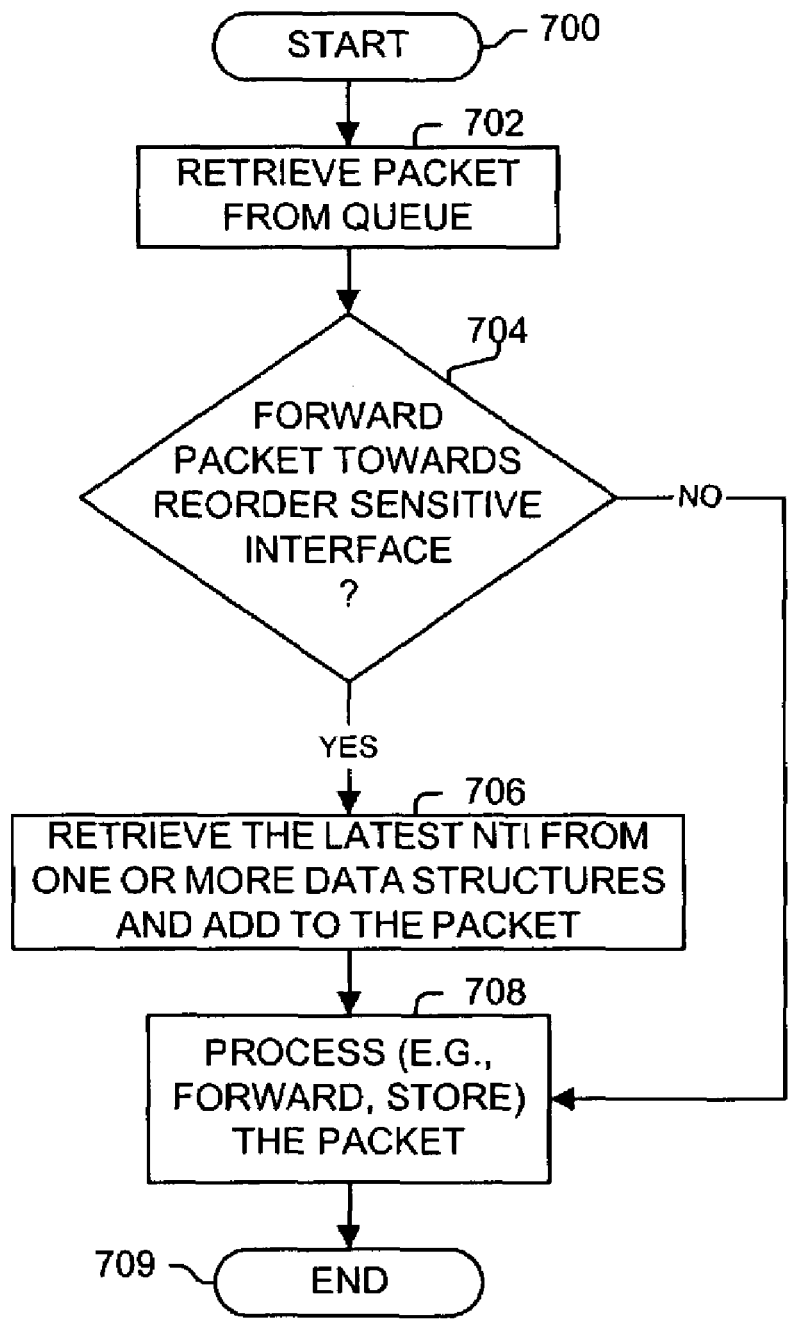
PACKET PROCESSING BY FORWARDING ENGINE FIGURE 7A

**PROCESSING OF NTI UPDATES

METHODS AND APPARATUS FOR FILTERING PACKETS FOR PREVENTING PACKET REORDER AND DUPLICATION IN A NETWORK

TECHNICAL FIELD

One embodiment of the invention especially relates to communications and computer systems; and more particularly, one embodiment relates to methods and apparatus for identifying the relevancy of packets, such as for, but not limited to filtering packets for preventing packet reorder and duplication in a network, such as, but not limited to a Resilient Packet Ring (RPR) network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Resilient Packet Ring (RPR) networks are based on two counter-rotating rings that transfer packets between nodes. The rings are generally referred to as inner and outer. RPR nodes contain transit buffers to hold traffic that is transiting through the node. The emerging standard allows for one or two transit buffers; the second transit buffer tends to be very large, on the order of hundreds of kilobytes or even megabytes.

RPR networks can use a steering based protection mechanism in order to restore traffic flow following a facility or nodal failure. Steering based protection refers to the fact that that source stations will change the direction of transmission if the destination station is no longer reachable due to the failure.

In order to support efficient bridging, packets may be flooded by a source on both ring; using a time-to-live (TTL) mechanism to limit their travel on the rings such that they do not overlap. However, if a node is optically bypassed (or in a mode where it behaves like a optical pass-through), the TTL mechanism will fail and the packet will be double delivered to one node. Eventually, the topology mechanism will determine the bypass exists and will modify the flooding scope. However, if the preferred ring to deliver packets is changed, then there is a synchronization race to determine when to start accepting the packets from the other ring.

Consider the following scenario that illustrates another mechanism for misordering. Traffic is flowing on the outer ring between the source and destination. Immediately adjacent to the source, the outer ring is broken. Therefore, some packets are in flight from the source to the destination on the outer ring just past the break. The source station learns of the failure and steers traffic to the inner ring. Now, with the appropriate traffic pattern on the ring the transit buffers on the outer ring could be very congested, while the inner ring is uncongested. Therefore the newly steered traffic could arrive at the destination prior to the traffic on the outer ring.

One method of insuring that reorder does not occur would be to wait to steer the traffic, until all of the traffic on the outer ring is delivered. However, due to the size of the transit buffers this could take a large amount of time. As RPR rings are supposed to protect in under fifty milliseconds. It is clear that steering cannot be guaranteed to protect in under fifty milliseconds and insure no misorder. New methods and apparatus are desired which may reduce or eliminate packet reorder and/or duplication.

SUMMARY

Methods and apparatus are disclosed for identifying the relevancy of packets. In one embodiment, source addresses are associated with network topology indications. When a packet is received, its network topology indication is compared with the corresponding one retrieved from a data structure to determine whether to drop the packet. Source addresses may also be associated with authorized interfaces to determine whether a packet was received on an authorized interface. In one embodiment, a maintained network topology indication is associated with a packet. After it is processed, the corresponding latest network topology indication is retrieved and compared with that previously associated with the packet. In one embodiment, upon a change in a network topology indication associated with an interface, control packets are placed in each of the queues corresponding to the destination interface, so it can be readily identified when this update has been propagated through the system.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 4A, 4B, 5A, 5C, 6A, 6B, 7A and 7B are flow diagrams illustrating a few of an unlimited number of processes that can be used in one or more embodiments for identifying relevancy of packets, with some, none or all of these processes being used in a particular embodiment.

DETAILED DESCRIPTION

Figure 1A:
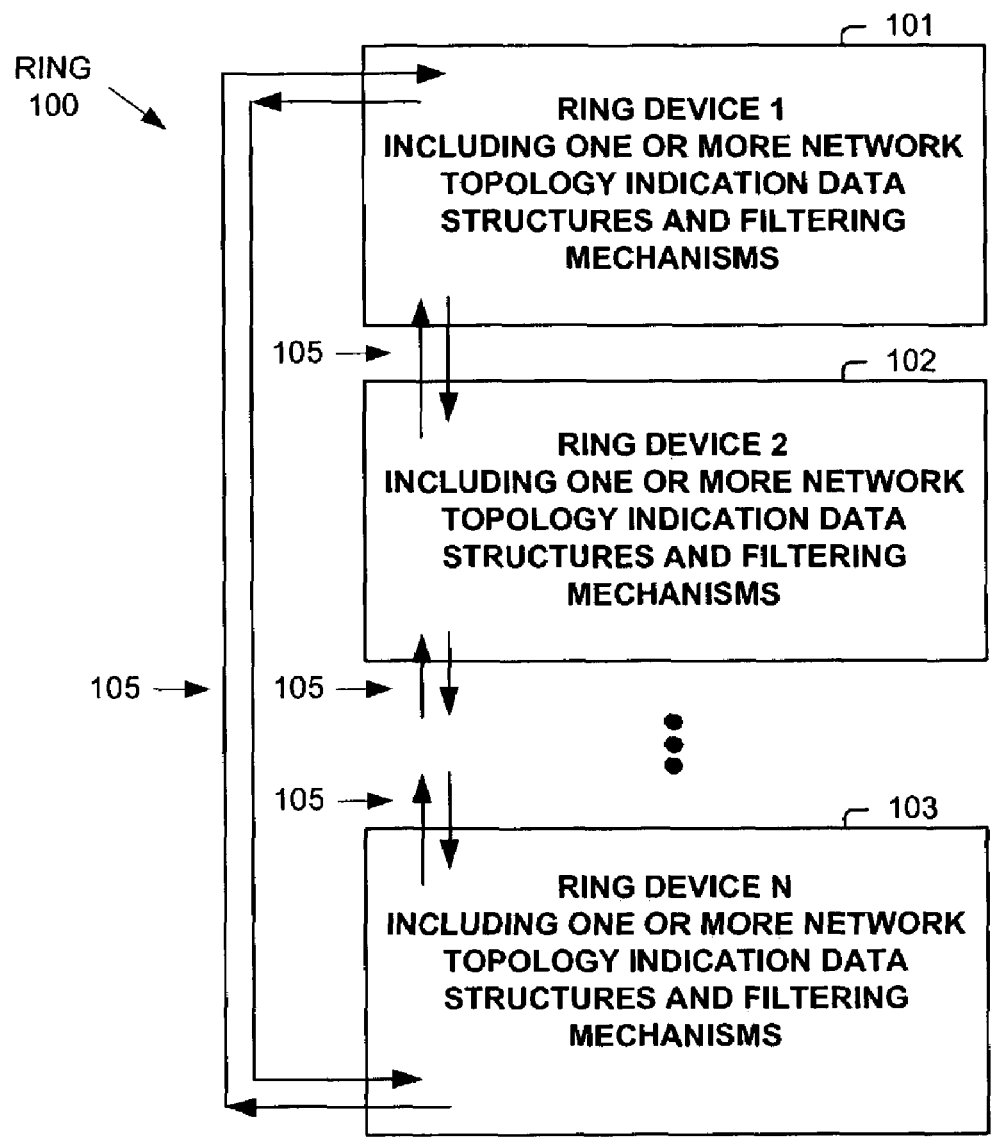
FIG. 1A is a block diagram of a ring of devices including one or more network topology indication data structures and mechanisms for identifying the relevancy of packets.

Methods and apparatus are disclosed for identifying the relevancy of packets, such as for, but not limited to filtering packets for preventing packet reorder and duplication in a network, such as, but not limited to a Resilient Packet Ring (RPR) network. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Methods and apparatus are disclosed for identifying the relevancy of packets. In one embodiment, source addresses are associated with network topology indications. When a packet is received, its network topology indication is compared with the corresponding one retrieved from a data structure to determine whether to drop the packet. Source addresses may also be associated with authorized interfaces to determine whether a packet was received on an authorized interface. In one embodiment, a maintained network topology indication is associated with a packet. After it is processed, the corresponding latest network topology indication is retrieved and compared with that previously associated with the packet. In one embodiment, upon a change in a network topology indication associated with an interface, control packets are placed in each of the queues corresponding to the destination interface, so it can be readily identified when this update has been propagated through the system.

Methods and apparatus are disclosed for identifying the relevancy of packets, such as for, but not limited to filtering packets for preventing packet reorder and duplication in a network, such as, but not limited to a Resilient Packet Ring (RPR) network. In one embodiment, one or more data structures associate source addresses with network topology indications. A first packet is received, with the first packet identifying a particular source address and a particular network topology indication. A maintained network topology indication is retrieved from the one or more data structures based on the particular source address, and it is compared with the particular network topology indication to determine whether to drop or process the packet. The network topology indications are updated to reflect changes in a network.

In one embodiment, the one or more data structures associate source addresses with authorized interfaces, and from which, a maintained authorized interface indication is retrieved based on the particular source address of a received packet. The maintained authorized interface indication is compared with the particular network topology indication of the received packet to determine whether to drop or process the packet. The authorized interface indications are updated to reflect changes in a network. In one embodiment, required match indications are maintained for source addresses to determine whether a particular network topology indication must match that maintained in a data structure.

In one embodiment, one or more first data structures associate network interfaces with network topology indications. A first packet is identified, and a first maintained network topology indication is retrieved from the one or more first data structures based on a destination interface of the first packet. The first maintained network topology indication is then associated with the first packet, and the first packet is forwarded to the destination interface. One or more second data structures associating network interfaces with network topology indications are maintained. The first packet is received by the destination interface, and a second maintained network topology indication is then retrieved from the one or more second data structures. The first maintained network topology indication is compared with the second maintained network topology indication to determine whether to drop or process the packet. The network topology indications are updated to reflect changes in a network.

In one embodiment, in response to a change in a network, a flush packet identified with a new network topology indication is placed in each of the queues whose packets are destined for the destination interface, and a count of the number of flush packets identified with the new network topology indication and processed by the destination interface is maintained. When the count equals the number of the flush packets (i.e., the number of queues), propagation of the new network topology indication has been completed.

Note, in one embodiment, a source address corresponds to a particular interface value (e.g., a MAC address). In one embodiment, a source address corresponds to a network node or device value (e.g., an IP address). In one embodiment, a source address corresponds to a value used to identify one or more nodes, devices, interfaces, or any other identifiable unit(s), component(s), etc.

FIG. 1A illustrates an exemplary system including a ring 100 of devices 101-103, each including one or more network topology indication data structures and filtering mechanisms. As shown, devices 101-103 are interconnected by links 105. Ring 100 may correspond to a Resilient Packet Ring (RPR) network or any other network.

Figure 1B:
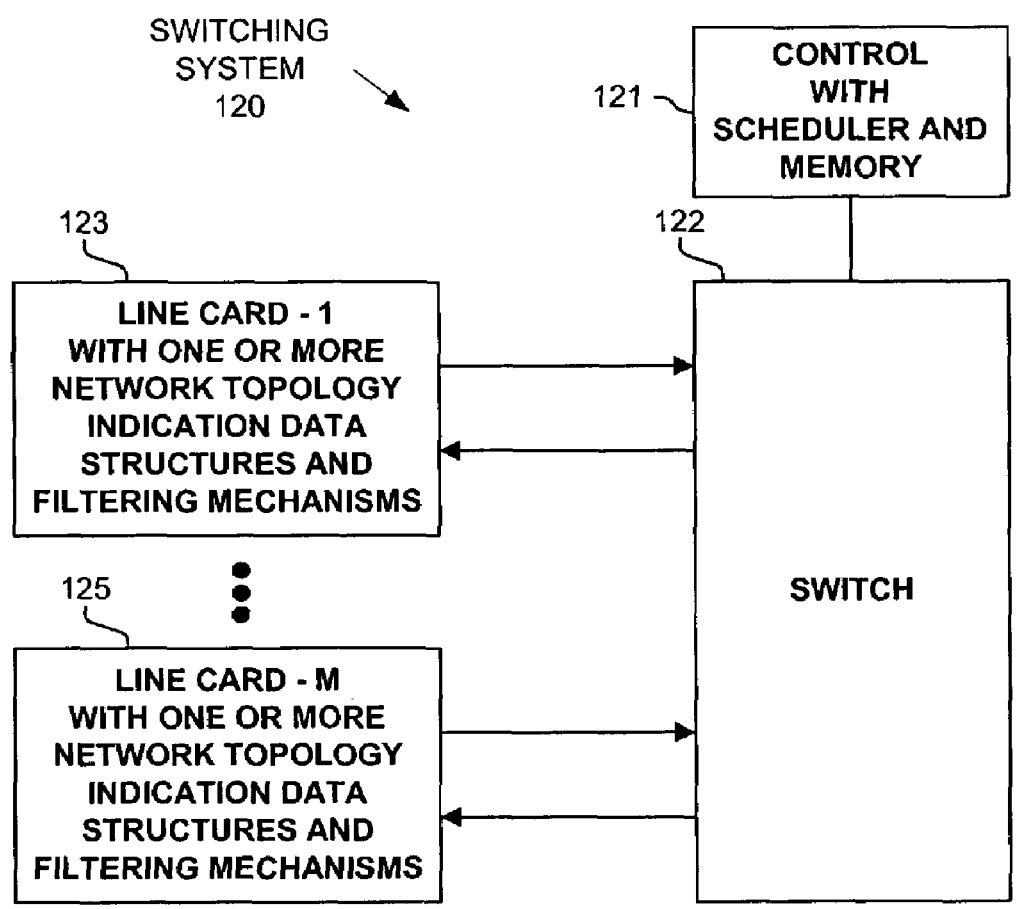
FIG. 1B is a block diagram of a switching system including line cards with one or more network topology indication data structures and one or more mechanisms for identifying the relevancy of packets.

FIG. 1B illustrates a packet switching system 120 including multiple line cards 123-125, with each of these line cards typically including one or more network topology indication data structures and filtering mechanisms. Packet switch 122, as controlled by control with scheduler and memory 121, controls the switching of packets between line cards 123-125.

Figure 1C:
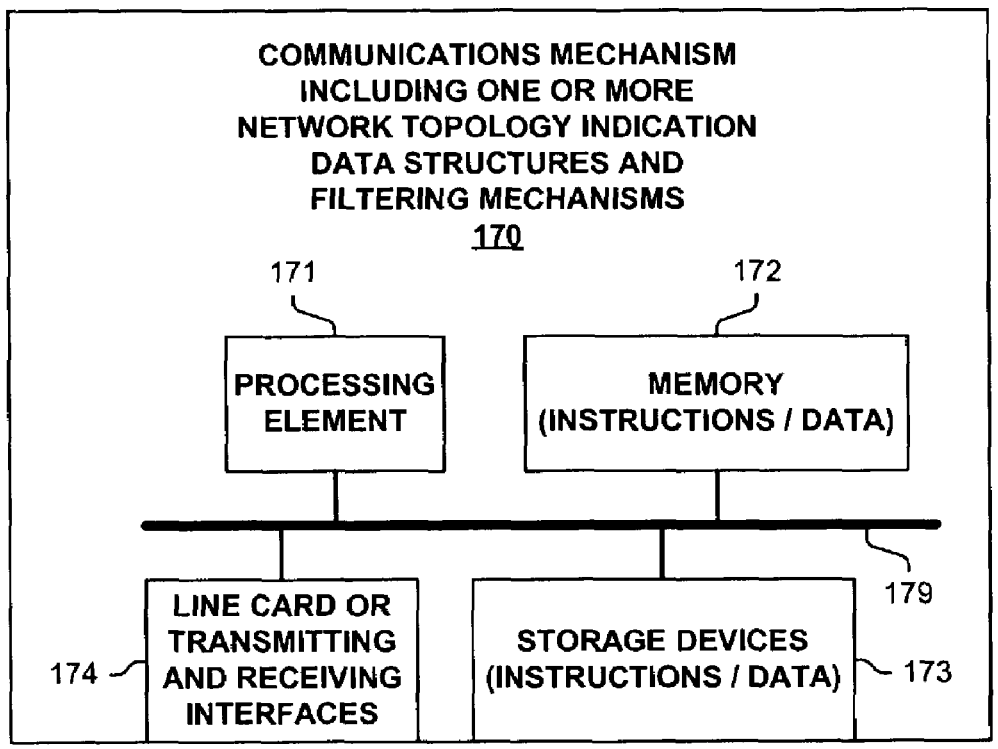
FIG. 1C is a block diagram of a communications mechanism with one or more network topology indication data structures and one or more mechanisms for identifying the relevancy of packets.
Figure 2:
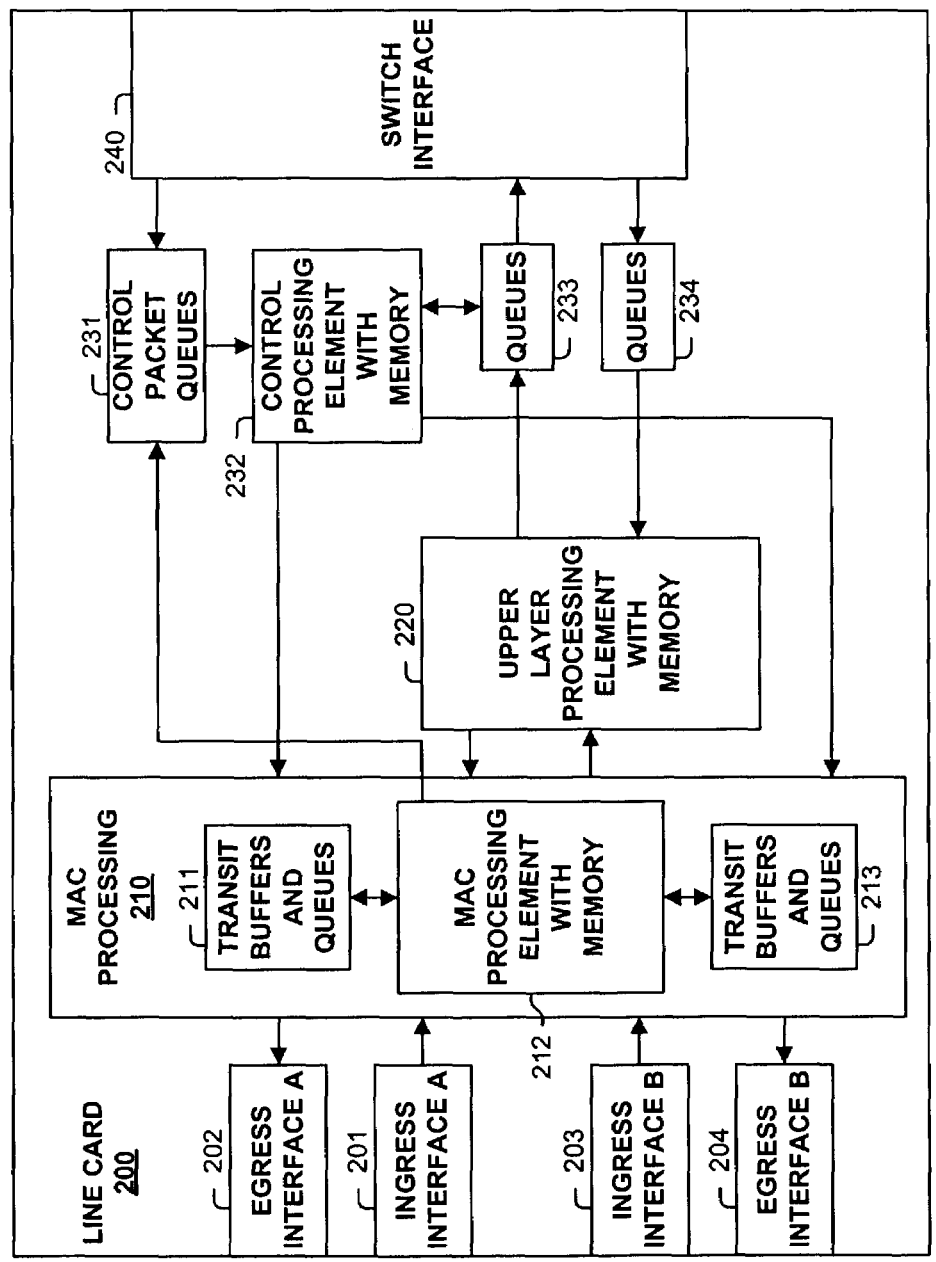
FIG. 2 is a block diagram of a line card with one or more network topology indication data structures and one or more mechanisms for identifying the relevancy of packets.

FIG. 1C is a block diagram of one embodiment of a computer or communications mechanism 170, which includes one or more network topology indication data structures and filtering mechanisms. In one embodiment, mechanism 170 includes a processing element 171, memory 172, storage devices 173, and line cards or transmitting and receiving interfaces 174 for communicating with other entities (e.g., nodes, components, devices, etc.), which are typically coupled via one or more communications mechanisms 179 (shown as a bus for illustrative purposes). Various embodiments of computer or communications mechanism may include more or less elements. In one embodiment, line cards or transmitting and receiving interfaces 174 corresponds to one or more line cards 200 (FIG. 2). In one embodiment, one or more network topology indication data structures are stored in memory 172 and the packet filtering is controlled by processing element 171, such as using one or more processes corresponding to the flow diagrams illustrated herein, variants thereof, or any other process of an embodiment.

The operation of communications mechanism 170 is typically controlled by processing element 171 using memory 172 and storage devices 173 to perform one or more tasks or processes. Memory 172 is one type of computer-readable medium, and typically comprises random access memory (RAM), read only memory (ROM), flash memory, integrated circuits, and/or other memory components. Memory 172 typically stores computer-executable instructions to be executed by processing element 171 and/or data which is manipulated by processing element 171 for implementing functionality in accordance with the invention. Storage devices 173 are another type of computer-readable medium, and typically comprise solid state storage media, disk drives, diskettes, networked services, tape drives, and other storage devices. Storage devices 173 typically store computer-executable instructions to be executed by processing element 171 and/or data which is manipulated by processing element 171 for implementing functionality in accordance with the invention.

FIG. 2 illustrates a line card 200 used in one embodiment for reducing or eliminating packet reorder and/or duplication in a network. Line card 200 may be part of a system or device such as those illustrated in FIGS. 1A-C, and/or may perform one or more of the functions of the flow diagrams illustrated herein, variants thereof, or any other process of an embodiment.

In the embodiment shown, line card 200 includes multiple ingress interfaces 201 and 203 and multiple egress interfaces 202 and 204. In one configuration, ingress and egress interfaces 201 and 202 correspond to one direction of a ring, while ingress and egress interfaces 203 and 204 correspond to the other direction of a ring. Note, line card 200 can be attached to one or more networks of other topologies as well as other devices, and is not limited to use in a ring network.

Ingress interfaces 201 and 203 receive packets which are typically forwarded to MAC Processing 210, which in one embodiment, includes a MAC processing element with memory 212 (which typically includes logic elements and/or a processor), and one or more sets of transit buffers and queues 211 and 213. MAC processing element with memory 212 typically performs some processing and storage (e.g., queuing or buffering) of the received packets. If MAC Processing 210 identifies the packet as a control packet, then it is placed in control packet queues 231.

Control processing element with memory 232 retrieves control packets from control packets queues 231 and performs the corresponding processing. In one embodiment, a control packet may identify a change in a network topology, and in response, one or more data structures are updated with a new network topology indication for the source addresses which are affected by the network topology change. Additionally, if control processing element with memory 232 identifies the network topology change, it may propagate this change to other nodes via control packets to MAC Processing 210.

In one embodiment, the new network topology indication for a particular source address is received from another node (e.g., originated by a node corresponding to the source address or another node). In one embodiment, line card 200 identifies a next network topology indication for a source address in response to determining a change in network topology, such as, but not limited to that identified in a received control packet. In one embodiment, the network topology indication is a predetermined sequence of values; while in one embodiment, random values are used. The network topology change may or may not include a change in an authorized interface (e.g., ingress interfaces 201 and 203) on which a packet is to be allowed to be received for a particular source address. If there is a change, typically one or more data structures are updated to reflect this change.

Otherwise, if MAC Processing 210 identifies the packet as a data packet (e.g., a non-control packet), then a lookup operation is performed in one or more network topology indication data structures to identify the authorized interface and the particular network topology indication corresponding to the source address of the packet. Typically, if the packet was not received on the authorized interface, the packet is dropped. If the network topology indications are externally generated and the packet contains an out of date indication (e.g., one that does not match that retrieved from the one or more data structures), then the packet is dropped. However, in one embodiment, if there has not been a recent change in authorized interface for the source address of the packet, then the packet may be accepted regardless of the network topology indication as packets belonging to the packet stream sent from the source address still be in order (and thus, they do not need to be dropped.) If the packet is received without a network topology indication, then the one retrieved from the one or more data structures is associated with the packet (either explicitly by adding to the packet or implicitly by some manner such as by an associated network identification control packet placed in a queue or buffer), and the packet is stored in MAC Processing 210 or forwarded to upper layer processing element with memory 220 (which typically includes logic elements and/or a processor).

If MAC Processing 210 identifies the packet as a transit packet destined for another node (e.g., the packet is just passing through line card 200), it is typically temporarily stored and subsequently forwarded to, and sent from egress interface 202 or 204. Otherwise, the data packet is typically forwarded to upper layer processing element with memory 220, which performs some higher-level protocol processing (e.g., routing lookups, filtering lookups, etc.), and places the data packet in an appropriate one of the queues 233. The packet is subsequently retrieved from queues 233 and forwarded through switch interface 240, typically to another line card 200.

In one embodiment, MAC Processing 210 controls the sending of packets from transit buffers and queues 211 and 213, and performs another lookup in the one or more data structures to identify the current network topology indication for the source address of a next packet to be sent from transit buffers and queues 211 and 213. In one embodiment, if the network topology indication of that associated with the packet and that retrieved from the one or more data structures do not match, then the packet is dropped; otherwise, it is forwarded to the appropriate egress interface 202 or 204. In one embodiment, if there has not been a recent change in authorized interface for the corresponding source address of the packet, this check is not performed.

Similarly, in one embodiment, control processing element with memory 232 (which typically includes logic elements and/or a processor) or upper layer processing element with memory 220 controls the sending of packets from queues 233, and performs another lookup in the one or more data structures to identify the current network topology indication for the source address of a next packet to be sent from queues 233. In one embodiment, if the network topology indication of that associated with the packet and that retrieved from the one or more data structures do not match, then the packet is dropped; otherwise, it is forwarded to switch interface 240. In one embodiment, if there has not been a recent change in authorized interface for the corresponding source address of the packet, this check is not performed.

In a similar manner, switch interface 240 can receive control and data packets from other line cards or devices via a switch fabric or other mechanism. Control packets are typically placed in control packet queues 231 and data packets are placed in queues 234. In one embodiment, the received data packets are associated with a network topology indication from the one or more data structures if the packet is not already associated with a network topology indication. These data packets typically travel from switch interface 240 to queues 234, to upper layer processing element with memory 220, and then to MAC Processing 210 (and possibly stored in one of the transit buffers and queues 211 or 213), and then are checked against the current network topology indication for the corresponding source address as described previously and also hereinafter especially in relation to one or more of the flow diagrams.

Figure 3:
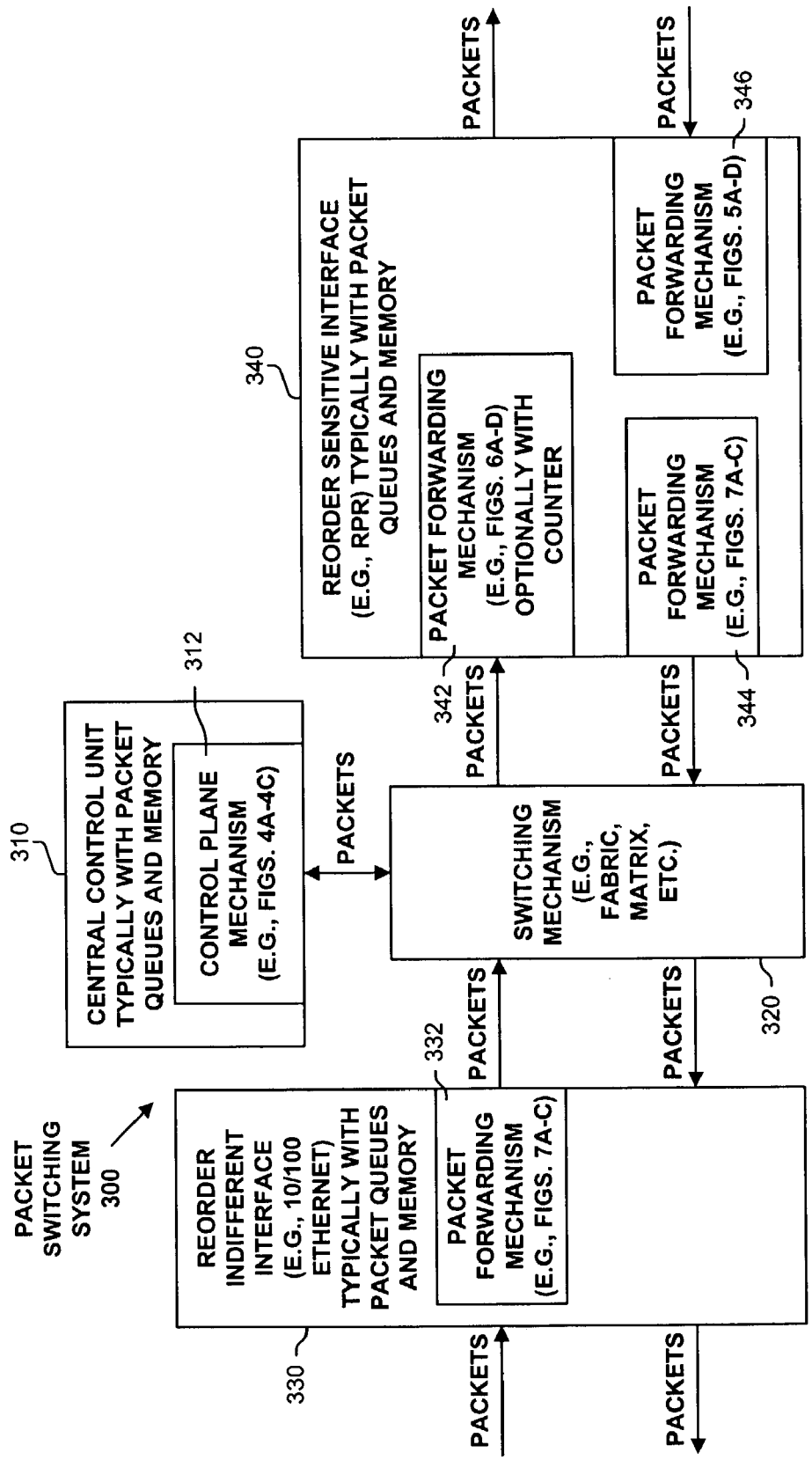
FIG. 3 is a block diagram of a packet switching system or other communication mechanism which illustrates one or more of an unlimited number of uses of various embodiments identifying the relevancy of packets.

FIG. 3 illustrates a block diagram of a switching system 300, which may use one or more embodiments in the processing of packets. FIG. 3 is used to illustrate some possible applications of various embodiments and of the processes and data structures illustrated herein, and does not limit the use or applicability of one or more embodiments to certain elements, devices, line cards, or other entities. Rather, FIG. 3 illustrates the expansive and flexible nature of embodiments and their ability to operate in a manner consistent with the needs and the design of a system. Moreover, FIG. 3 references figures corresponding to flow diagrams and data structures illustrated herein. These references are illustrative in nature of one or more embodiments, and not all embodiments. For example, the processing illustrated in a flow diagram may be performed by one or more of the packet forwarding mechanisms, control plane mechanisms, and other mechanisms used in a system, and not just the corresponding device as illustrated in FIG. 3.

Turning to FIG. 3, packet switching system 300 as shown includes a central control unit 310, which typically includes one or more packet queues and memory. As shown, central control unit 310 includes a control plane mechanism 312, which, in one embodiment, performs the functions corresponding to the flow diagrams of FIGS. 4A-B and uses the data structure corresponding to that illustrated in FIG. 4C.

Packet switching system 300 typically also includes some switching mechanism 320, such as, but not limited to a switching fabric, matrix, bus, etc.

Packet switching system 300 may also support and use various types of interfaces (e.g., line cards, interface devices, etc.). For example, shown in FIG. 3 are reorder sensitive interface 340 (e.g., an RPR interface), which typically includes packet queues and memory, and reorder indifferent interface 330 (e.g., Ethernet interface), which typically includes packet queues and memory. Note, some reorder sensitive interfaces include Ethernet and other types of interfaces, and some reorder indifferent interfaces include RPR and other types of interfaces.

Figure 7B:
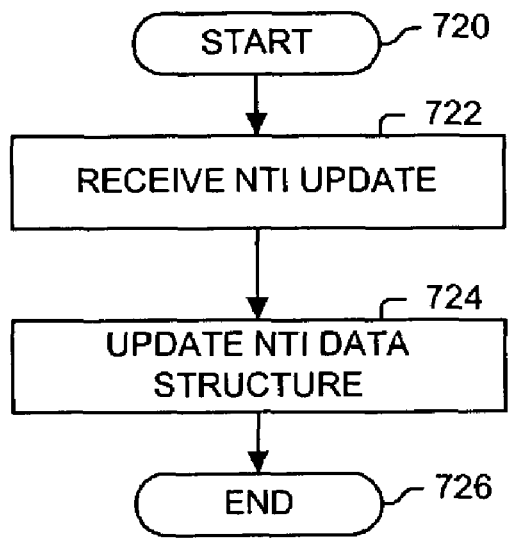
Figure 7C:
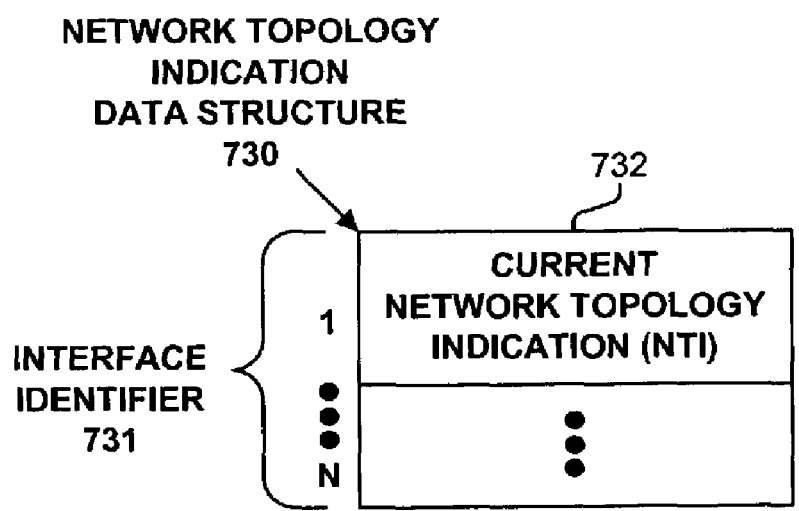

As shown, reorder indifferent interface 330 includes a packet forwarding mechanism 332, which, in one embodiment, performs the functions corresponding to the flow diagrams of FIGS. 7A-B and uses the data structure corresponding to that illustrated in FIG. 7C.

Figure 5A:
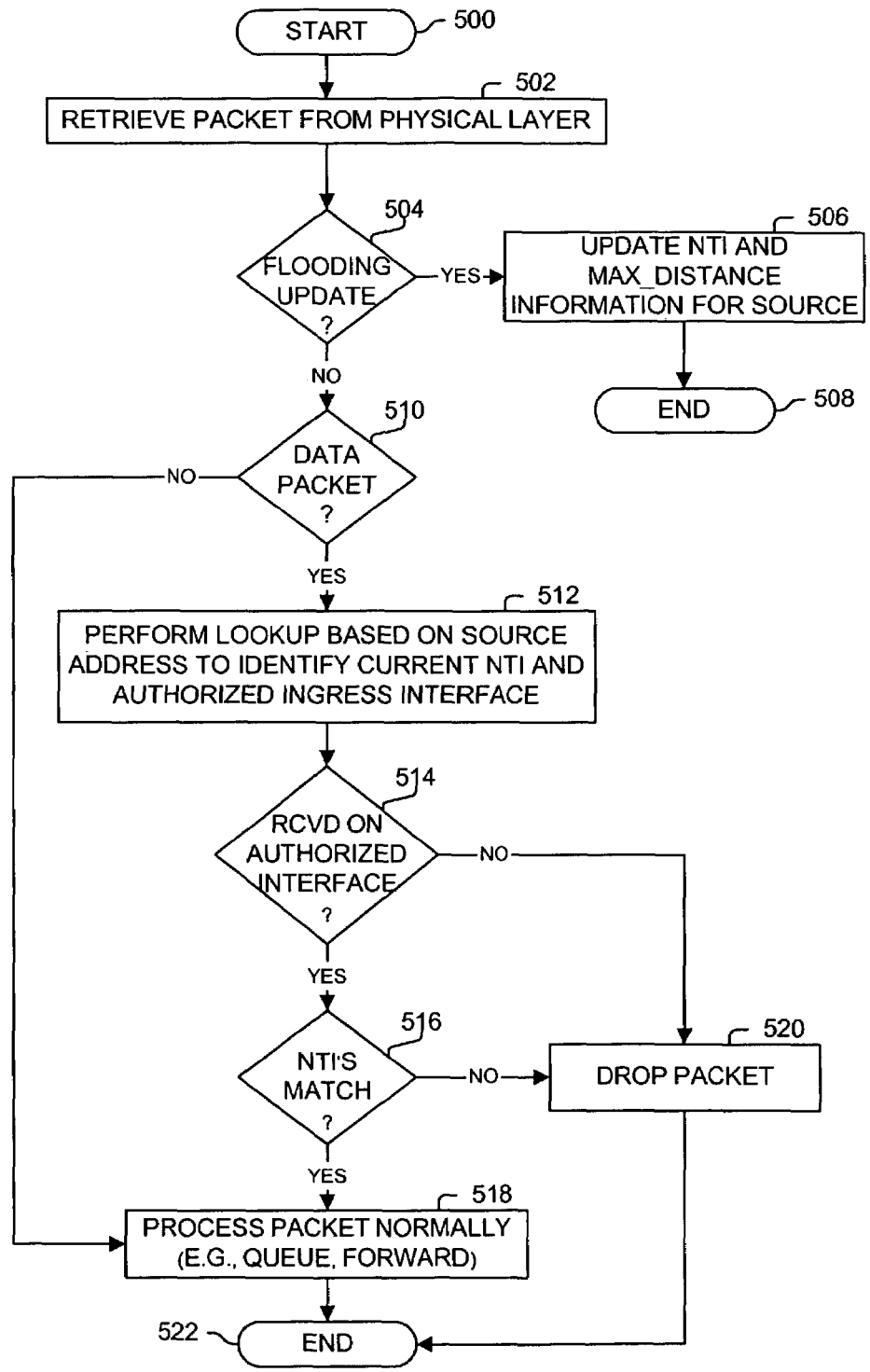
Figure 5B:
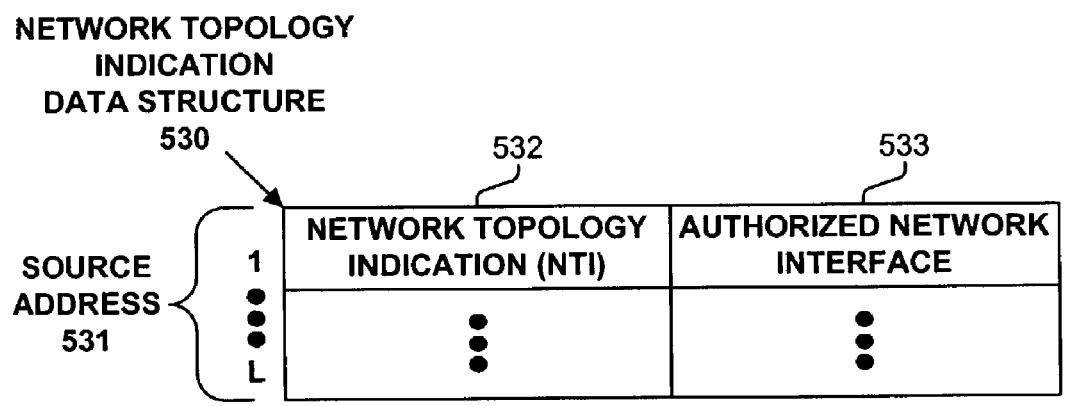
Figure 5C:
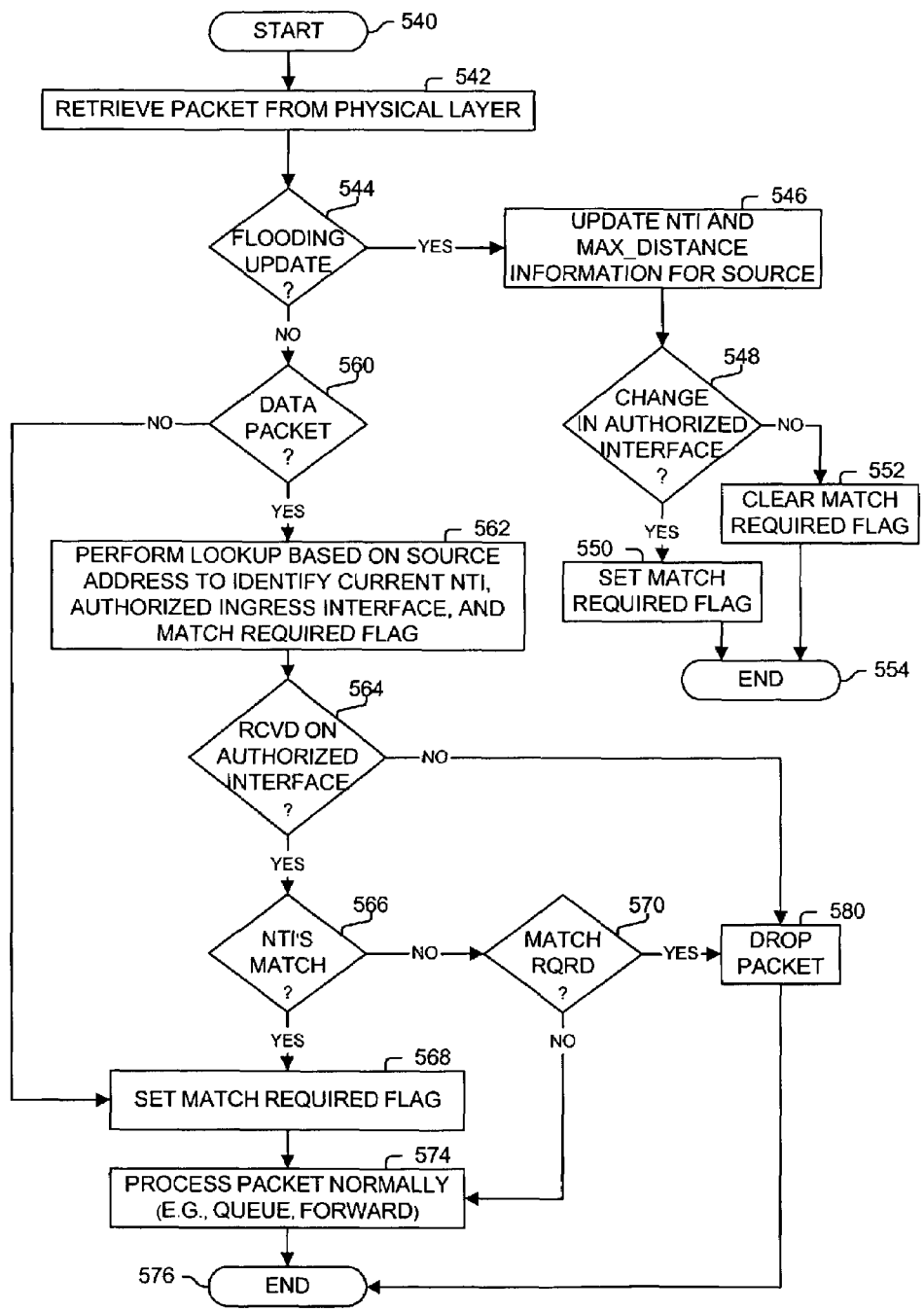
Figure 5D:
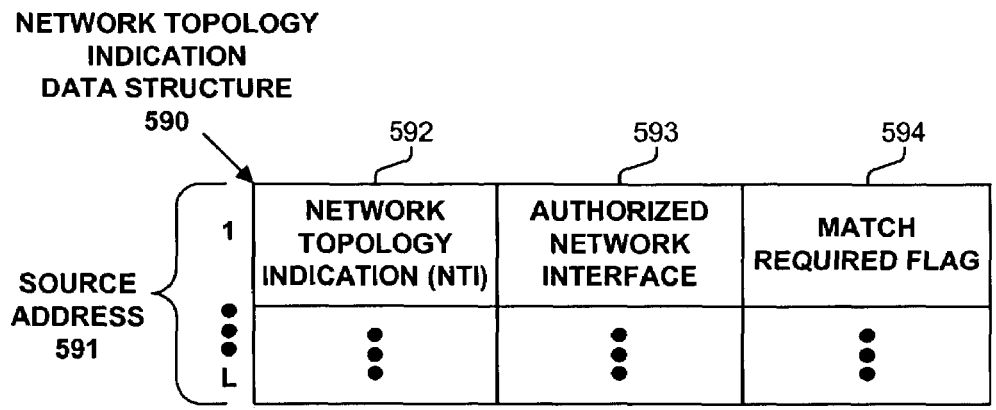
Figure 6A:
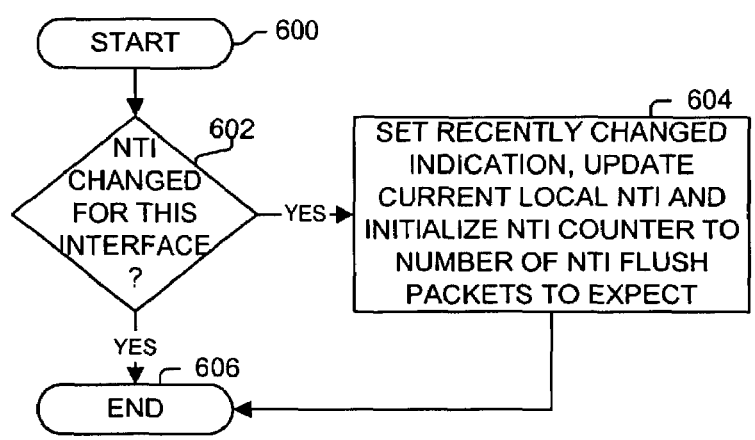
Figure 6B:
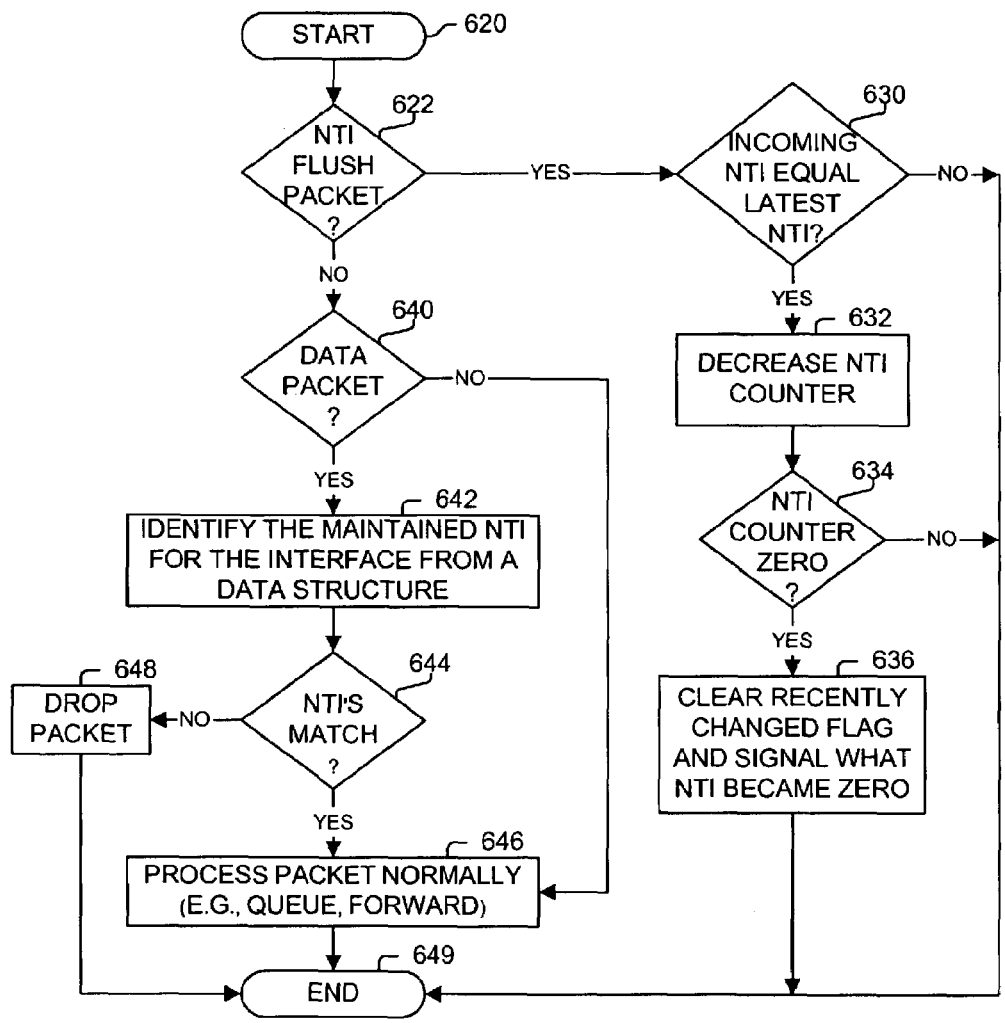
Figure 6C:
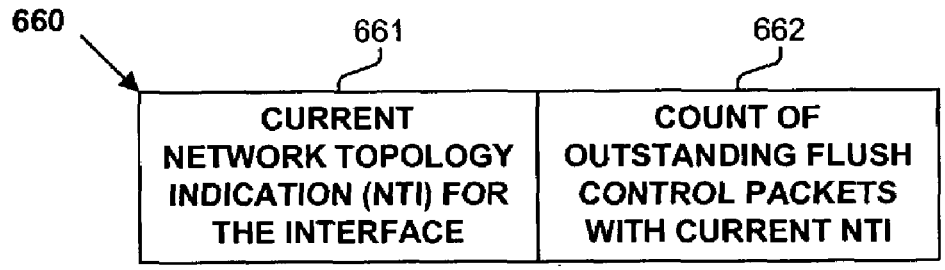
Figure 6D:
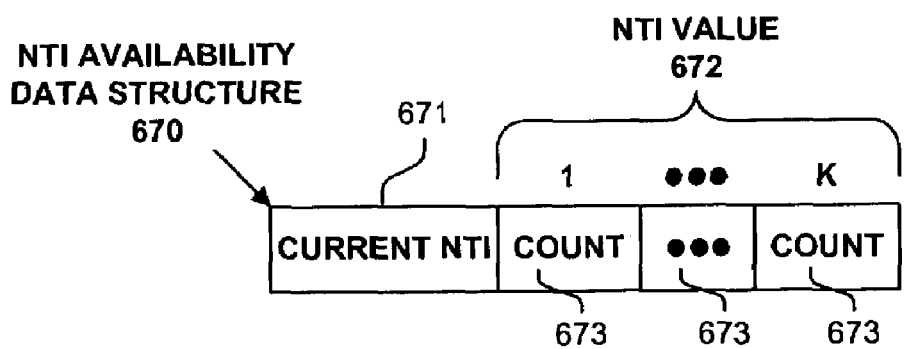

As shown, reorder sensitive interface 340 includes a packet forwarding mechanism 342, which, in one embodiment, performs the functions corresponding to the flow diagrams of FIGS. 6A-B and uses the data structures corresponding to that illustrated in FIGS. 6C-D; a packet forwarding mechanism 344, which, in one embodiment, performs the functions corresponding to the flow diagrams of FIGS. 7A-B and uses the data structure corresponding to that illustrated in FIG. 7C; and a packet forwarding mechanism 346, which, in one embodiment, performs the functions corresponding to the flow diagrams of FIGS. 5A and 5C and uses the data structures corresponding to that illustrated in FIGS. 5B and 5D.

Figure 4A:
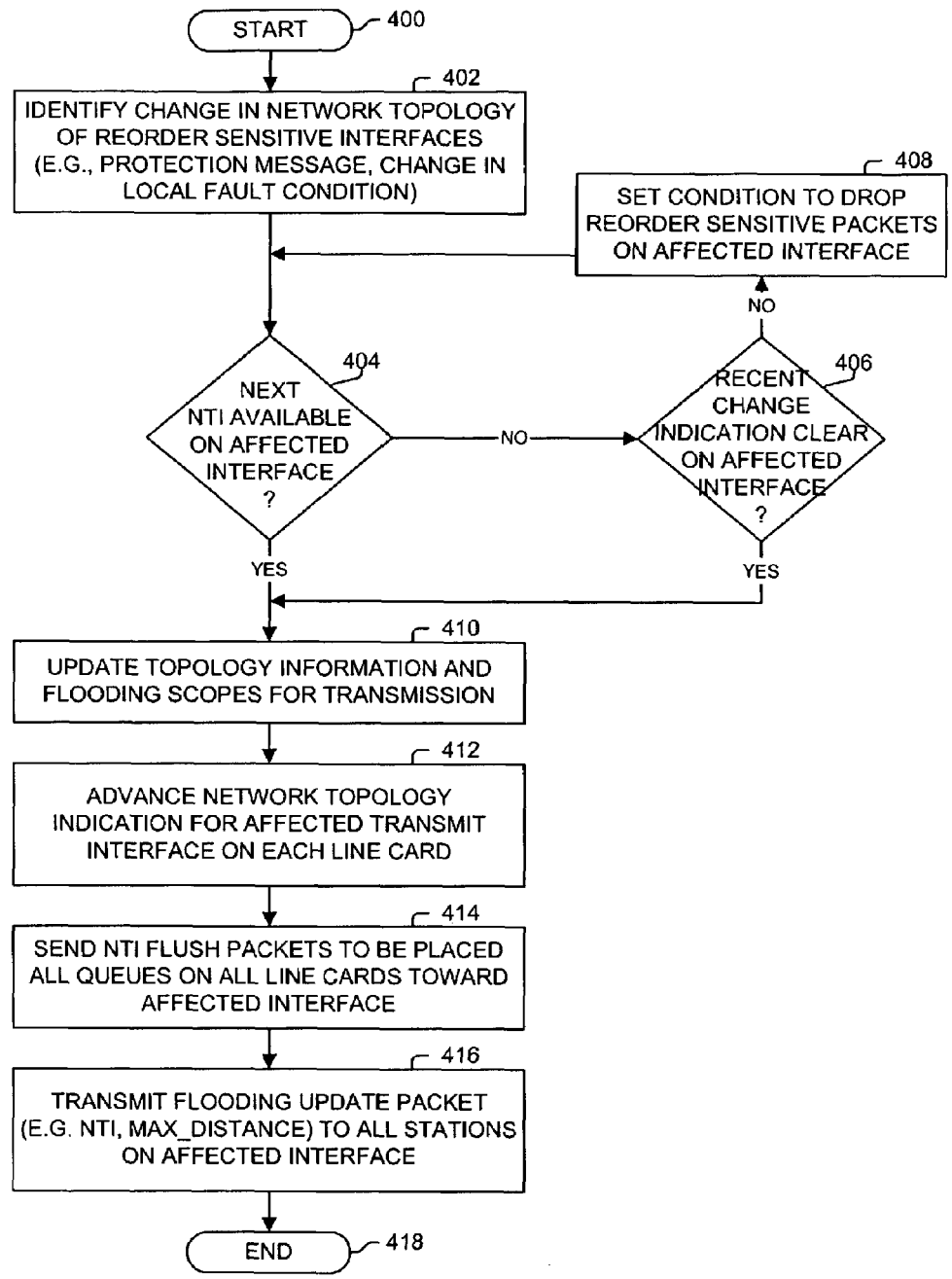

FIG. 4A illustrates a process used in one embodiment to recognize changes in a network and to update local and/or remote network topology indications ("NTIs"). Processing begins with process block 400, and proceeds to process block 402, wherein a change in the network topology is identified (typically of, but not limited to a reorder sensitive interface), such as, but limited to in response to a protection or control message, a local fault condition or indication, etc. As determined in process block 404, if an NTI is available to use (e.g., the next NTI of a predetermined sequence of NTI values), then processing proceeds to process block 410. Otherwise, processing optionally delays and waits for some duration to see if an NTI becomes available as determined in process block 406 (e.g., by a recent change or other indication from the affected interface). If an NTI becomes available, processing proceeds to process block 410; otherwise, in process block 408, a condition is set in the affected interface to drop reorder sensitive packets (e.g., control packets and certain data packets are typically not dropped), and processing returns to process block 404.

In process block 410, the topology information and flooding scopes are determined and the corresponding data structures updated. The flooding scope typically refers to on which interface a packet is sent to reach a destination, which may change in response to a change in the identified network topology. In process block 412, the next network topology indication for the affected transmit interface on each line card is determined (e.g., advanced to a next value in a predetermined sequence). In process block 414, in one embodiment, NTI flush control packets are placed in each of the queues destined for an affected interface such that it can be readily determined if the change has been completely propagated by counting the number of these NTI flush control packets received at an affected interface. In process block 416, a flooding update packet is typically sent to all stations (e.g., nodes) over the affected interface so they can update their data structures and process packets accordingly. The flooding update packets typically include the latest NTI for the corresponding affected interface, and possibly a MAX_DISTANCE parameter to inform the other stations the number of hops a packet sent from this node is to traverse so they can determine the direction in a ring on which to expect future communication from this node. Processing is complete as indicated by process block 418.

Figure 4B:
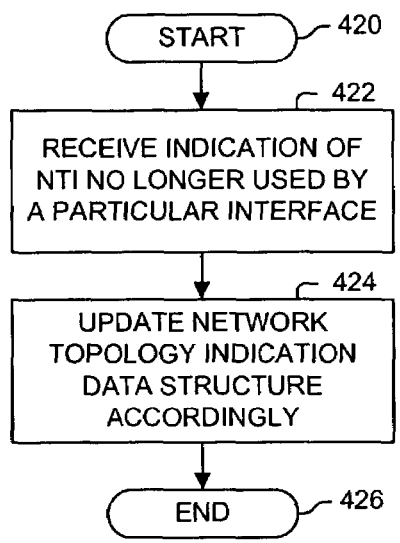

FIG. 4B illustrates a process used in one embodiment. Processing begins with process block 420, and proceeds to process block 422, wherein an indication is received that a particular NTI is no longer used by a particular interface. In process block 424, a corresponding network topology indication data structure is updated accordingly. Processing is complete as indicated by process block 426.

Figure 4C:
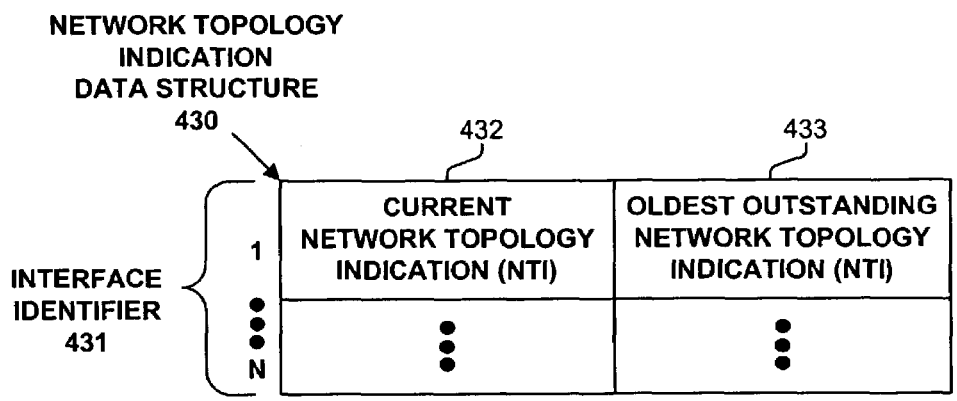
FIGS. 4C, 5B, 5D, 6C, 6D and 7C are block diagrams illustrating a few of an unlimited number of data structures that can be used in one or more embodiments for identifying relevancy of packets, with some, none or all of these data structures being used in a particular embodiment.

FIG. 4C illustrates a network topology indication data structure 430 used in one embodiment used to maintain the current (i.e., latest) NTI value 432 for a particular interface (i.e., accessed based on an interface identifier value 431), and an oldest outstanding NTI value 433 for each interface (e.g., so that an NTI will not be reused until it is no longer used/present in the system). In one embodiment, a bitmap or other value or values are used to identify which NTI are currently in use and/or which are currently not in use.

FIG. 5A illustrates a process used in one embodiment to process packets received from an external node or other source. Note, this processing may be performed by the receiving interface or another component of the system.

Processing begins with process block 500, and proceeds to process block 502, wherein the packet is retrieved from the physical layer processing. As determined in process block 504, if it is a flooding update packet, then in process block 506, one or more data structures are updated based on the received NTI and/or MAX_DISTANCE values for the sender of the packet. Processing is then complete as indicated by process block 508.

Otherwise, as determined in process block 510, if the packet is not a data packet, processing proceeds to process block 518, wherein it is processed. Otherwise, in process block 512, a lookup is performed in one or more data structures to identify the current NTI and/or authorized ingress interface (note, these can be separate lookups and optionally the NTI is retrieved after process block 514). As determined in process block 514, if the packet was not received on the authorized interface, then it is dropped in process block 520. Otherwise, as determined in process block 516, if the NTI of the received packet and the NTI retrieved from the one or more data structures do not match, then the packet is dropped in process block 520. Otherwise, the data packet is processed in process block 518. Processing is complete as indicated by process block 522.

FIG. 5B illustrates a network topology indication data structure 530 used in one embodiment to reference based on source address 531, the current/latest NTI value 532 and authorized network interface 533.

FIG. 5C illustrates a process used in one embodiment to process packets received from an external node or other source, and is one of an unlimited number of variants of the processing performed in FIG. 5A. Note, this processing may be performed by the receiving interface or another component of the system.

Processing begins with process block 540, and proceeds to process block 542, wherein the packet is retrieved from the physical layer processing. As determined in process block 544, if it is a flooding update packet, then in process block 546, one or more data structures are updated based on the received NTI and/or MAX_DISTANCE values for the sender of the packet. As determined in process block 548, if there was a change in the authorized interface for the source, then in process block 550, a match required flag is set to require matching of the latest NTI value. Otherwise, in process block 552, this match required flag is cleared so that matching is not required as in one network topology, without a change in the authorized interface, packets will not be received out of order, and thus, the NTI can be ignored for this source address. Processing is then complete as indicated by process block 554.

Otherwise, as determined in process block 560, if the packet is not a data packet, processing proceeds to process block 568. Otherwise, in process block 562, a lookup is performed in one or more data structures to identify the current NTI and/or authorized ingress interface (note, these can be separate lookups and optionally the NTI is retrieved after process block 564). As determined in process block 564, if the packet was not received on the authorized interface, then it is dropped in process block 580. Otherwise, as determined in process block 566, if the NTI of the received packet and the NTI retrieved from the one or more data structures do not match, then if determined in process block 570 that a match is required, then the packet is dropped in process block 580; otherwise processing proceeds to process block 574. If the NTIs did match, then the match required flag is set for this source address in process block 568. In process block 574, the packet is processed. Processing is complete as indicated by process block 576.

FIG. 5D illustrates a network topology indication data structure 590 used in one embodiment to reference based on source address 591, the current/latest NTI value 592, authorized network interface 593, and match required flag 594.

FIG. 6A illustrates a process used in one embodiment to react to a change in the NTI for a local interface. Processing begins with process block 600. As determined in process block 602, if the NTI has changed for this interface, then in process block 604, the recently changed indication is set (e.g., for use by process block 406 of FIG. 4A), one or more local data structures are updated with the new NTI, and the NTI counter (e.g., a physical counter, data structure value, etc.) is initialized to the number of NTI flush packets to be received for the updated NTI value (or another counting mechanism is used). Depending on the one embodiment, the number of NTI flush packets may correspond to the number of transit queues, transit paths, priority levels, and/or other values and/or combinations of these and other items. Processing is complete as indicated by process block 606.

FIG. 6B illustrates the processing of packets received, such as, but not limited to those from a switching mechanism or other interface as performed in one embodiment. Processing begins with process block 620. As determined in process block 622, if the packet is an NTI flush packet, then processing proceeds to process block 630, otherwise to process block 640.

As determined in process block 630, if the NTI of the flush packet equals the current (i.e., latest) NTI value stored in one or more local data structures, then the NTI counter is decreased in process block 632, and if the value becomes zero as determined by process block 634, then, in process block 636, the recently changed flag is cleared and the NTI value which became zero is identified. Processing is then completed as indicated by process block 649. Note, in one embodiment, multiple counters are employed to track the number of flush packets received for multiple outstanding NTI values, not just the latest NTI value; and thus, these NTI values may become available as soon as all corresponding flush packets have been processed.

Otherwise, as determined in process block 640, if the packet is not a data packet, the packet is processed normally in process block 646, and processing is complete as indicated by process block 649. Otherwise, in process block 642, the latest NTI value for the current interface as maintained in one or more data structures is retrieved. As determined in process block 644, if the NTI associated with the packet and the retrieved NTI do not match, then the packet is dropped in process block 648. Otherwise, the packet is processed normally in process block 646, and processing is complete as indicated by process block 649.

FIG. 6C illustrates a network topology indication data structure 660 used in one embodiment to maintain the current (i.e., latest) NTI value 661 for the interface, and the count 662 of outstanding flush control packets for the current NTI value.

FIG. 6D illustrates a network topology indication data structure 670 used in one embodiment to maintain the current (i.e., latest) NTI value 671 for the interface, and the counts 673 of the outstanding flush control packets corresponding to the possible NTI values 672.

FIG. 7A illustrates a process used in one embodiment to process packets by a forwarding engine or other mechanism. Processing begins with process block 700, and proceeds to process block 702, wherein a packet is retrieved from a queue. Next, as determined in process block 704, if the packet is to be forwarded to a reorder sensitive interface, then in process block 706, the current (i.e., latest) NTI value is retrieved from one or more data structures for the interface, with this NTI value associated with the packet (e.g., added to the packet or associated via some data structure or other mechanism). Typically, this NTI value corresponds to the interface currently processing the packet. However, in one embodiment, the NTI value for the destination interface is used. In process block 708, the packet is processed (e.g., forwarded to or stored for transmitting to the destination interface). Processing is complete as indicated by process block 709.

FIG. 7B illustrates a process used in one embodiment to update one or more data structures in response to a change in an NTI value for an interface. Processing begins with process block 720, and proceeds to process block 722, wherein the NTI update is received (e.g., via a control packet, piggybacked in another packet, or communicated or derived via another mechanism). Next, in process block 724, the one or more data structures are updated accordingly with the NTI value for the corresponding network interface. Processing is complete as indicated by process block 726.

FIG. 7C illustrates a network topology indication data structure 730 used in one embodiment to reference based on interface identifier 731, the current/latest NTI value 732 for the corresponding interface.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for identifying relevancy of packets, the method comprising:
   maintaining one or more data structures in memory associating source addresses with network topology indications;
   receiving a first packet over a network, the first packet including a particular source address and a particular network topology indication;
   retrieving a maintained network topology indication from said one or more data structures based on the particular source address; and
   comparing said retrieved maintained network topology indication with the particular network topology indication, and in response: dropping the first packet in response to identifying said retrieved maintained network topology indication does not match the particular network topology indication, or processing the first packet in response to identifying said retrieved maintained network topology indication matches the particular network topology indication;
   wherein the network topology indication is a value representing a particular topology of the network; wherein different topology indications represent different topologies of the network; and wherein a change in the topology of the network to a new topology results in a different topology indication used to represent the new topology of the network.

2. The method of claim 1, comprising:
   receiving a second packet indicating a change in topology associated with the particular source address; and
   updating said one or more data structures with a new network topology indication associated with the particular source address.

3. The method of claim 1, wherein said one or more data structures associate source addresses with authorized interfaces; and the method comprising:
   retrieving a maintained authorized interface indication from said one or more data structures based on the particular source address; and
   identifying that the maintained authorized interface indication corresponds to a network interface on which the first packet was received, and in response, not dropping the first packet.

4. The method of claim 3, further comprising:
   receiving a second packet indicating a change in topology associated with the particular source address; and
   updating said one or more data structures with a new authorized interface indication associated with the particular source address.

5. The method of claim 1, wherein said one or more data structures associate source addresses with required match indications; and the method comprises:
   retrieving a maintained required match indication from said one or more data structures based on the particular source address; and
   in response to identifying the maintained network topology indication does not match the particular network topology indication and that that the maintained required match indication requires a match: dropping the first packet.

6. The method of claim 1, wherein said one or more data structures associate source addresses with required match indications; and the method comprises:
   retrieving a maintained required match indication from said one or more data structures based on the particular source address; and
   in response to identifying the maintained network topology indication does not match the particular network topology indication and that that the maintained required match indication does not require a match: processing the first packet.

7. The method of claim 1, wherein the network topology indication is a value selected from a predetermined sequence of values representing various topologies of the network.

8. The method of claim 1, wherein the network topology indication is a randomly selected value.

9. The method of claim 1, wherein the network topology indication identifies a particular topology of a dual ring network.

10. A method for identifying relevancy of packets, the method comprising:
    maintaining, in memory, one or more first data structures associating network interfaces with network topology indications;
    identifying a first packet;
    retrieving a first maintained network topology indication from said one or more first data structures based on a destination interface of the first packet;
    associating the first maintained network topology indication with the first packet;
    forwarding the first packet to the destination interface;
    maintaining, in memory, one or more second data structures associating network interfaces with network topology indications;

receiving the first packet on the destination interface;

identifying a second maintained network topology indication from said one or more second data structures; and comparing the first maintained network topology indication with the second maintained network topology indication, and in response: dropping the first packet in response to identifying the first maintained network topology indication does not match the second maintained network topology indication, or processing the first packet in response to identifying the first maintained network topology indication matches the second maintained network topology indication;

wherein the network topology indication is a value representing a particular topology of a network; wherein different topology indications represent different topologies of the network; and wherein a change in the topology of the network to a new topology results in a different topology indication used to represent the new topology of the network.

11. The method of claim 10, comprising:

receiving a second packet indicating a change in topology associated with the particular source address; and updating said first and second one or more data structures with a new network topology indication associated with the destination interface.

12. The method of claim 10, wherein the network topology indication is a value selected from a predetermined sequence of values representing various topologies of the network.

13. The method of claim 10, wherein the network topology indication is a randomly selected value.

14. The method of claim 10, wherein the network topology indication identifies a particular topology of a dual ring network.

15. A computer-readable medium stored thereon computer-executable instructions for performing steps when executed by one or more processing elements for identifying relevancy of packets, said steps comprising:

maintaining one or more data structures associating source addresses with network topology indications;

retrieving, for a received first packet identifying a particular source address and a particular network topology indication, a maintained network topology indication from said one or more data structures based on the particular source address; and comparing the maintained network topology indication with the particular network topology indication, and in response: dropping the first packet in response to identifying the maintained network topology indication does not match the particular network topology indication, or processing the first packet in response to identifying the maintained network topology indication matches the particular network topology indication;

wherein the network topology indication is a value representing a particular topology of a network; wherein different topology indications represent different topologies of the network; and wherein a change in the topology of the network to a new topology results in a different topology indication used to represent the new topology of the network.

16. The computer-readable medium of claim 15, wherein said one or more data structures associate source addresses with authorized interfaces; and said steps comprise:

retrieving a maintained authorized interface indication from said one or more data structures based on the particular source address; and in response to identifying that the maintained authorized interface indication does not correspond to a network interface on which the first packet was received: dropping the first packet.

17. The computer-readable medium of claim 15, wherein said one or more data structures associate source addresses with required match indications; and said steps comprise:

retrieving a maintained required match indication from said one or more data structures based on the particular source address; and in response to identifying the maintained network topology indication does not match the particular network topology and that the maintained required match indication requires a match: dropping the first packet.

18. The computer-readable medium of claim 15, wherein the network topology indication is a value selected from a predetermined sequence of values representing various topologies of the network.

19. The computer-readable medium of claim 15, wherein the network topology indication is a randomly selected value.

20. The computer-readable medium of claim 15, wherein the network topology indication identifies a particular topology of a dual ring network.

21. An apparatus for identifying relevancy of packets, the apparatus comprising:

means for maintaining one or more data structures associating source addresses with network topology indications;

means for receiving, over a network, a first packet identifying a particular source address and a particular network topology indication;

means for retrieving a maintained network topology indication from said one or more data structures based on the particular source address; and means for, in response to comparing the maintained network topology indication with the particular network topology indication, dropping the first packet in response to identifying the maintained network topology indication does not match the particular network topology indication, or processing the first packet in response to identifying the maintained network topology indication matches the particular network topology indication;

wherein the network topology indication is a value representing a particular topology of the network; wherein different topology indications represent different topologies of the network; and wherein a change in the topology of the network to a new topology results in a different topology indication used to represent the new topology of the network.

22. The apparatus of claim 21, wherein said one or more data structures associate source addresses with authorized interfaces; and the apparatus comprising:

means for retrieving a maintained authorized interface indication from said one or more data structures based on the particular source address; and means for either processing or dropping the first packet in response to identifying whether or not the maintained authorized interface indication corresponds to a network interface on which the first packet was received.

23. The apparatus of claim 21, wherein said one or more data structures associate source addresses with required match indications; and the apparatus comprising:

means for retrieving a maintained required match indication from said one or more data structures based on the particular source address; and means for either processing or dropping the first packet in response to identifying whether or not the maintained required match indication requires a match in response to identifying the maintained network topology indication does not match the particular network topology indication.

24. The apparatus of claim 21, wherein the network topology indication is a value selected from a predetermined sequence of values representing various topologies of the network.

25. The apparatus of claim 21, wherein the network topology indication is a randomly selected value.

26. A apparatus for identifying relevancy of packets, the apparatus comprising:
- means for maintaining one or more first data structures associating network interfaces with network topology indications;
- means for identifying a first packet;
- means for retrieving a first maintained network topology indication from said one or more first data structures based on a destination interface of the first packet;
- means for associating the first maintained network topology indication with the first packet;
- means for forwarding the first packet to the destination interface;
- means for maintaining one or more second data structures associating network interfaces with network topology indications;
- means for receiving the first packet on the destination interface;
- means for identifying a second maintained network topology indication from said one or more second data structures; and
- means for, in response to comparing the first maintained network topology indication with the second maintained network topology indication, dropping the first packet in response to identifying the first maintained network topology indication does not match the second maintained network topology indication, or processing the first packet in response to identifying the first maintained network topology indication matches the second maintained network topology indication;
- wherein the network topology indication is a value representing a particular topology of a network; wherein different topology indications represent different topologies of the network; and wherein a change in the topology of the network to a new topology results in a different topology indication used to represent the new topology of the network.

27. The apparatus of claim 26, wherein the network topology indication identifies a particular topology of a dual ring network.

28. The apparatus of claim 26, wherein the network topology indication is a value selected from a predetermined sequence of values representing various topologies of the network.

29. The apparatus of claim 26, wherein the network topology indication is a randomly selected value.

30. A method for identifying relevancy of packets, the method comprising:
- maintaining one or more data structures associating source addresses with network topology indications and associating source addresses with required match indications;
- receiving, over a network, a first packet identifying a particular source address and a particular network topology indication;
- retrieving a maintained network topology indication from said one or more data structures based on the particular source address;
- comparing the maintained network topology indication with the particular network topology indication;
- retrieving a maintained required match indication from said one or more data structures based on the particular source address; and
- in response to identifying the maintained network topology indication does not match the particular network topology indication and that the maintained required match indication requires a match: dropping the first packet in response;
- wherein the network topology indication is a value representing a particular topology of the network; wherein different topology indications represent different topologies of the network; and wherein a change in the topology of the network to a new topology results in a different topology indication used to represent the new topology of the network.

31. The method of claim 30, wherein the network topology indication is a value selected from a predetermined sequence of values representing various topologies of the network.

* * * * *